(12) United States Patent
Henze et al.

(10) Patent No.: US 8,891,773 B2
(45) Date of Patent: Nov. 18, 2014

(54) SYSTEM AND METHOD FOR KEY WRAPPING TO ALLOW SECURE ACCESS TO MEDIA BY MULTIPLE AUTHORITIES WITH MODIFIABLE PERMISSIONS

(71) Applicant: LSI Corporation, San Jose, CA (US)

(72) Inventors: Jonathan Henze, Rochester, MN (US); Jeffrey L. Williams, Rochester, MN (US); Randal Rysavy, Kasson, MN (US)

(73) Assignee: LSI Corporation, San Jose, CA (US)

( * ) Notice: Subject to any disclaimer, the term of this patent is extended or adjusted under 35 U.S.C. 154(b) by 20 days.

(21) Appl. No.: 13/763,890

(22) Filed: Feb. 11, 2013

(65) Prior Publication Data

US 2014/0229733 A1    Aug. 14, 2014

(51) Int. Cl.
*H04L 29/06* (2006.01)
*H04L 9/08* (2006.01)
*G06F 21/62* (2013.01)

(52) U.S. Cl.
CPC .............. *H04L 9/08* (2013.01); *G06F 21/6209* (2013.01); *H04L 63/102* (2013.01); *H04L 9/088* (2013.01); *H04L 9/0822* (2013.01)
USPC .............................. 380/281; 713/193; 726/28

(58) Field of Classification Search
CPC ..... H04L 9/0822; H04L 9/088; H04L 63/102; G06F 21/6209
See application file for complete search history.

(56) References Cited

U.S. PATENT DOCUMENTS

| | | | |
|---|---|---|---|
| 7,080,409 B2 * | 7/2006 | Eigeles | 726/28 |
| 7,711,120 B2 * | 5/2010 | Kimmel et al. | 380/279 |
| 7,730,094 B2 * | 6/2010 | Kaler et al. | 707/785 |
| 7,917,748 B2 * | 3/2011 | Hengeveld et al. | 713/163 |
| 8,010,809 B1 * | 8/2011 | Shah | 713/193 |
| 8,064,604 B2 * | 11/2011 | Youn | 380/277 |
| 8,145,916 B2 * | 3/2012 | Boshra et al. | 713/186 |
| 8,190,784 B1 * | 5/2012 | Raizen et al. | 710/5 |
| 8,261,099 B1 * | 9/2012 | Shah | 713/193 |
| 8,341,430 B2 * | 12/2012 | Ureche et al. | 713/193 |
| 8,423,789 B1 * | 4/2013 | Poo et al. | 713/189 |
| 8,452,934 B2 * | 5/2013 | Jogand-Coulomb et al. | 711/163 |
| 8,489,886 B2 * | 7/2013 | Boucher et al. | 713/182 |
| 8,595,507 B2 * | 11/2013 | Panchapakesan et al. | 713/184 |
| 8,751,828 B1 * | 6/2014 | Raizen et al. | 713/193 |

(Continued)

OTHER PUBLICATIONS

Chen, Jianxi; Feng, Dan; Shi, Zhan; "iVISA: A Framework for Flexible Layout Block-level Storage System", 20th International Conference on Advanced Information Networking and Applications, Apr. 18-20, 2006, vol. 2, 5 pages.*

(Continued)

*Primary Examiner* — Victor Lesniewski

(57) ABSTRACT

Aspects of the disclosure pertain to a system and method for key wrapping via a storage system to allow secure access to media of the system by multiple authorities with modifiable permissions. The keys used to encrypt ranges of the drive are not stored in plaintext and are recoverable using the credentials of an administrator or user with access to that particular range. An outside attacker cannot recover these keys and a malicious user can only recover the keys to the ranges that user is allowed to access. This is maintained while allowing administrators to modify permissions at any time and, while allowing both administrators and users to change their credentials at any time.

20 Claims, 5 Drawing Sheets

(56) References Cited

U.S. PATENT DOCUMENTS

| | | | |
|---|---|---|---|
| 8,798,262 B1* | 8/2014 | Raizen et al. | 380/30 |
| 2003/0169878 A1* | 9/2003 | Miles | 380/201 |
| 2003/0177379 A1* | 9/2003 | Hori et al. | 713/193 |
| 2005/0105719 A1* | 5/2005 | Hada | 380/28 |
| 2007/0168292 A1* | 7/2007 | Jogand-Coulomb et al. | 705/52 |
| 2007/0180210 A1* | 8/2007 | Thibadeau | 711/163 |
| 2008/0052777 A1* | 2/2008 | Kawano et al. | 726/18 |
| 2008/0123863 A1* | 5/2008 | Bade et al. | 380/282 |
| 2009/0323940 A1* | 12/2009 | Moffat et al. | 380/44 |
| 2010/0306635 A1* | 12/2010 | Tang et al. | 714/807 |
| 2010/0325732 A1* | 12/2010 | Mittal et al. | 726/26 |
| 2011/0107047 A1* | 5/2011 | Sela et al. | 711/163 |
| 2013/0031306 A1* | 1/2013 | Kim | 711/113 |
| 2013/0173931 A1* | 7/2013 | Tzafrir | 713/193 |
| 2013/0254536 A1* | 9/2013 | Glover | 713/165 |
| 2014/0019769 A1* | 1/2014 | Pittelko | 713/189 |

OTHER PUBLICATIONS

TCG Storage Architecture Core Specification; Jul. 1, 2011; Trusted Computing Group, Incorporated; pp. 1-318.

Elaine Barker and John Kelsey; Recommendation for Random Number Generation Using Deterministic Random Bit Generators; NIST Special Publication 800-90A; Jan. 2012; National Institute of Standards and Technology; pp. 1-136.

TCG Storage Security Subsystem Class: Opal; Jan. 27, 2009; Trusted Computing Group, Incorporated; pp. 1-81.

AES Key Wrap Specification; Nov. 16, 2001; pp. 1-23.

* cited by examiner

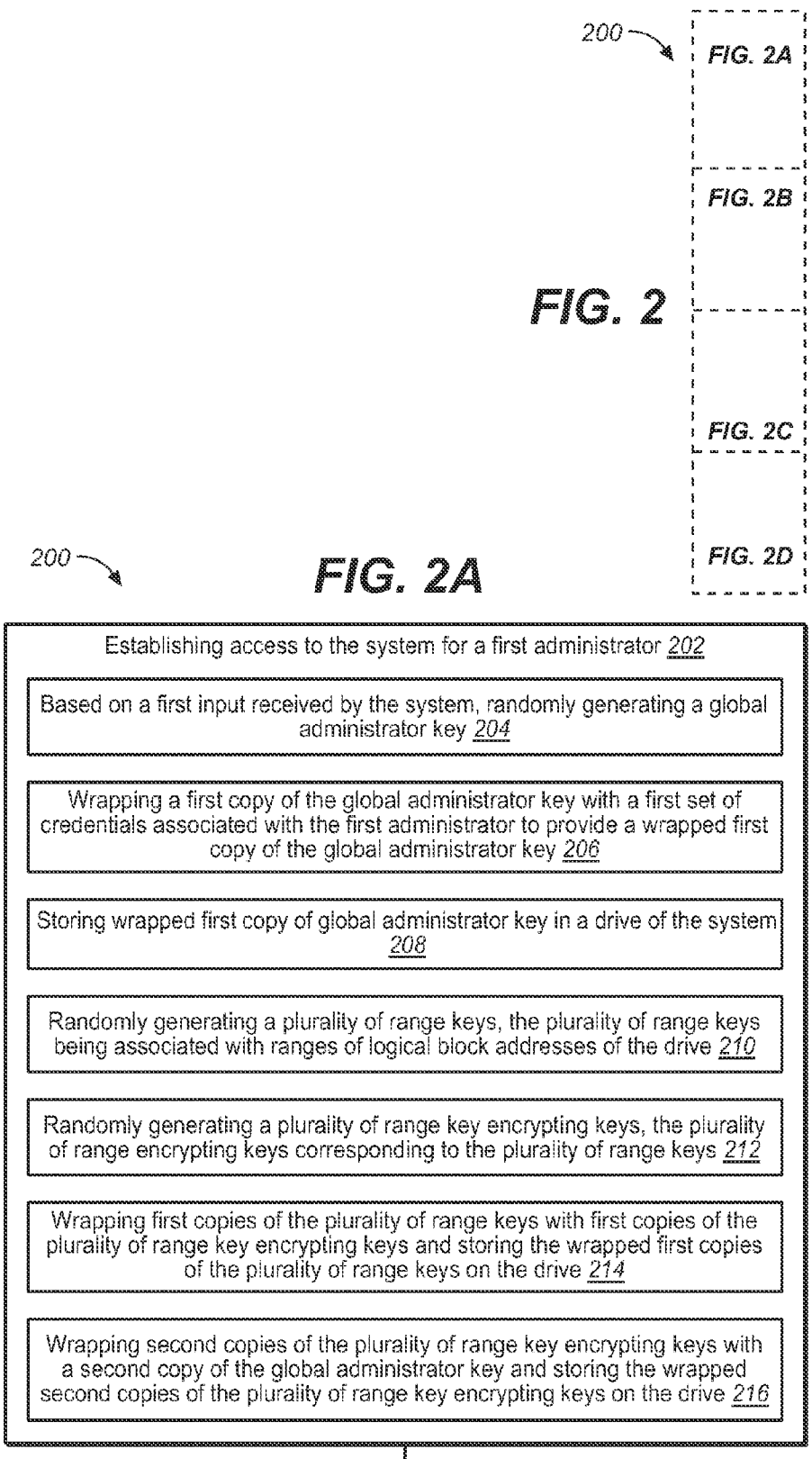

FIG. 2B

Establishing access to the system for a second administrator 218

Based on a second input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys 220

Wrapping a third copy of the global administrator key with a first set of credentials associated with the second administrator and storing the wrapped third copy of the global administrator key on the drive 222

Wrapping third copies of the plurality of range key encrypting keys with a fourth copy of the global administrator key and storing the wrapped third copies of the plurality of range key encrypting keys on the drive, wherein the first administrator is actively authenticated on the system during the step of establishing access to the system for the second administrator 224

Updating credentials of the first administrator 226

Based on a third input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys 228

Re-wrapping the first copy of the global administrator key with a second set of credentials associated with the first administrator and storing the re-wrapped first copy of the global administrator key on the drive 230

Allowing the first administrator to access a range of the drive 232

Based on a fourth input received by the system, unwrapping the first copy of the global administrator key, via utilization of the second set of credentials associated with the first administrator, to recover the first copy of the range key encrypting key, the range key encrypting key being associated with the range of the drive 234

Unwrapping wrapped first copy of range key included in the plurality of wrapped first copies of range keys, via the first copy of the range key encrypting key, the unwrapped first copy of range key corresponding to first copy of range key encrypting key 236

Programming a data encryption key into hardware registers of the system and accessing the data encryption key using the first copy of the range key encrypting key 238

SYSTEM AND METHOD FOR KEY WRAPPING TO ALLOW SECURE ACCESS TO MEDIA BY MULTIPLE AUTHORITIES WITH MODIFIABLE PERMISSIONS

FIELD OF THE INVENTION

The present disclosure relates to the field of electronic data access and particularly to a system and method for key wrapping to allow secure access to media by multiple authorities with modifiable permissions.

BACKGROUND

A number of storage systems currently provide security mechanisms for selectively allowing access to data (e.g., sensitive data) stored on drives of these systems. However, these security mechanisms sometimes provide less than desirable performance.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter in any manner Aspects of the disclosure pertain to a system and method for key wrapping to allow secure access to media by multiple authorities with modifiable permissions.

BRIEF DESCRIPTION OF THE FIGURES

The detailed description is described with reference to the accompanying figures:

FIGS. 2A-2D depict a flowchart illustrating a method for key wrapping to allow secure access to media by multiple authorities with modifiable permissions in accordance with an exemplary embodiment of the present disclosure.

WRITTEN DESCRIPTION

Embodiments of the invention will become apparent with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. Among other things, the features of the disclosure can be facilitated by methods, devices, and/or embodied in articles of commerce. The following detailed description is, therefore, not to be taken in a limiting sense.

Figure 1:
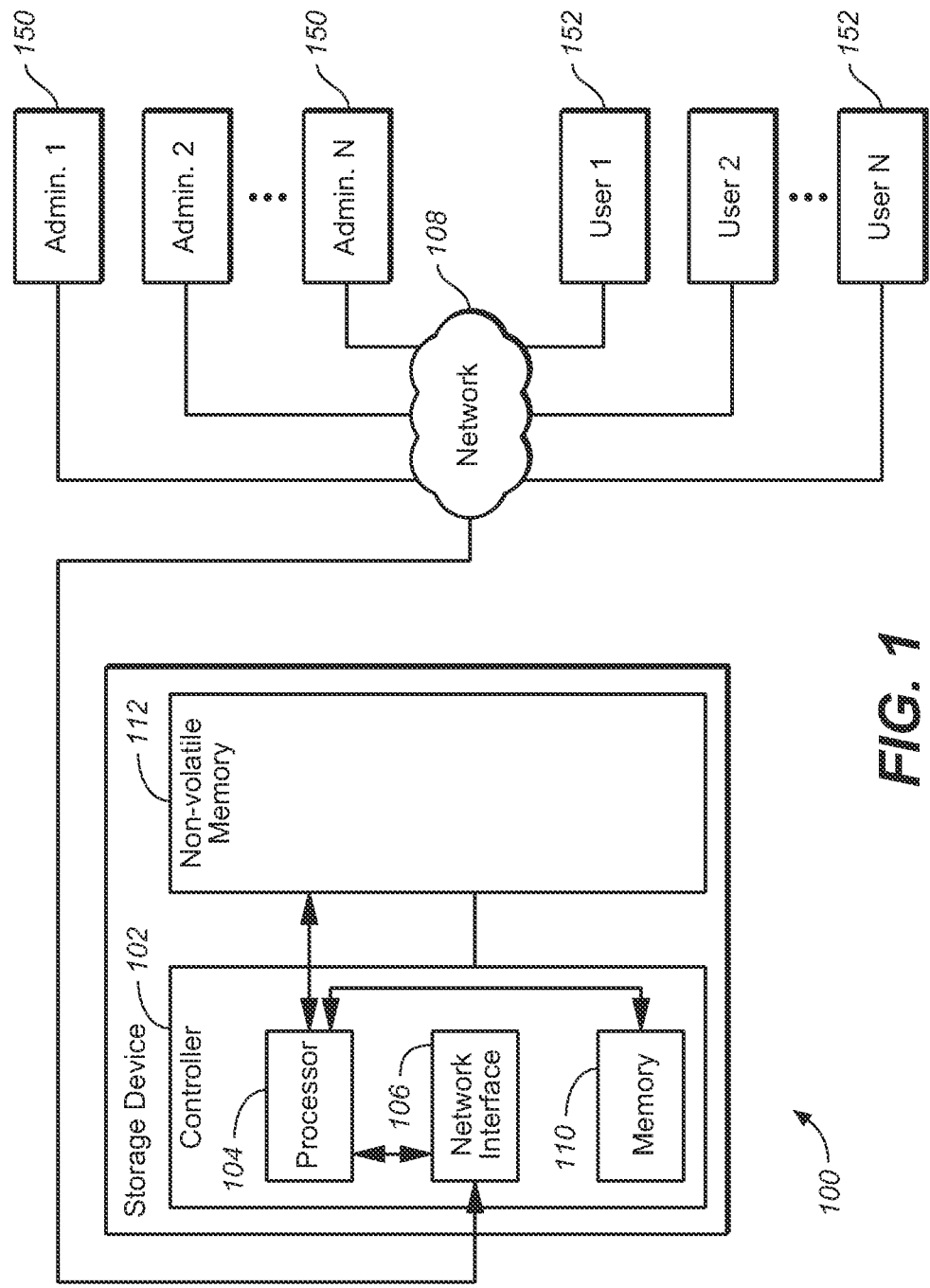
FIG. 1 is an example conceptual block diagram schematic of a system via which the methods disclosed herein can be implemented in accordance with an exemplary embodiment of the present disclosure.
Figure 2C:
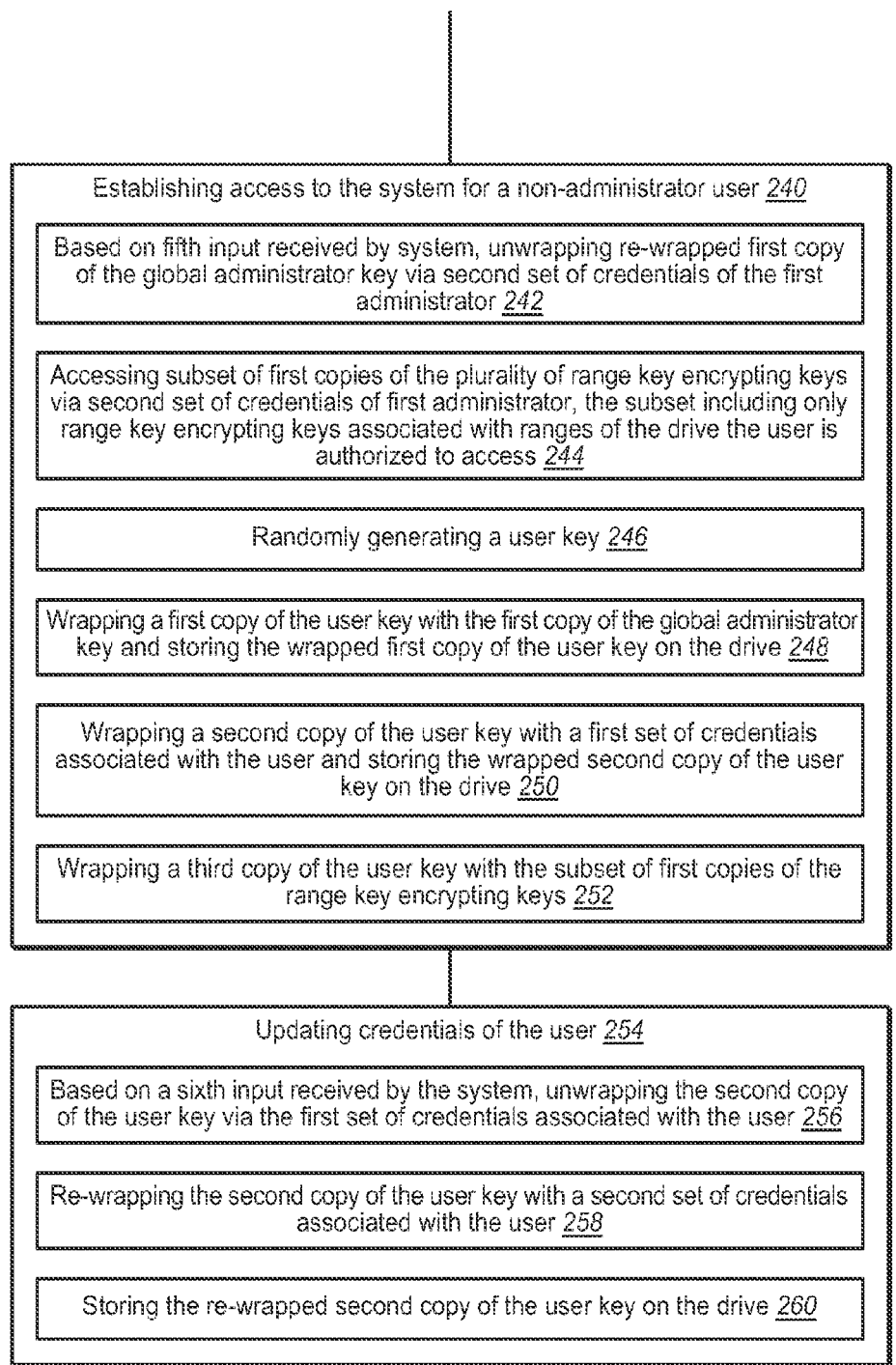
Figure 2D:
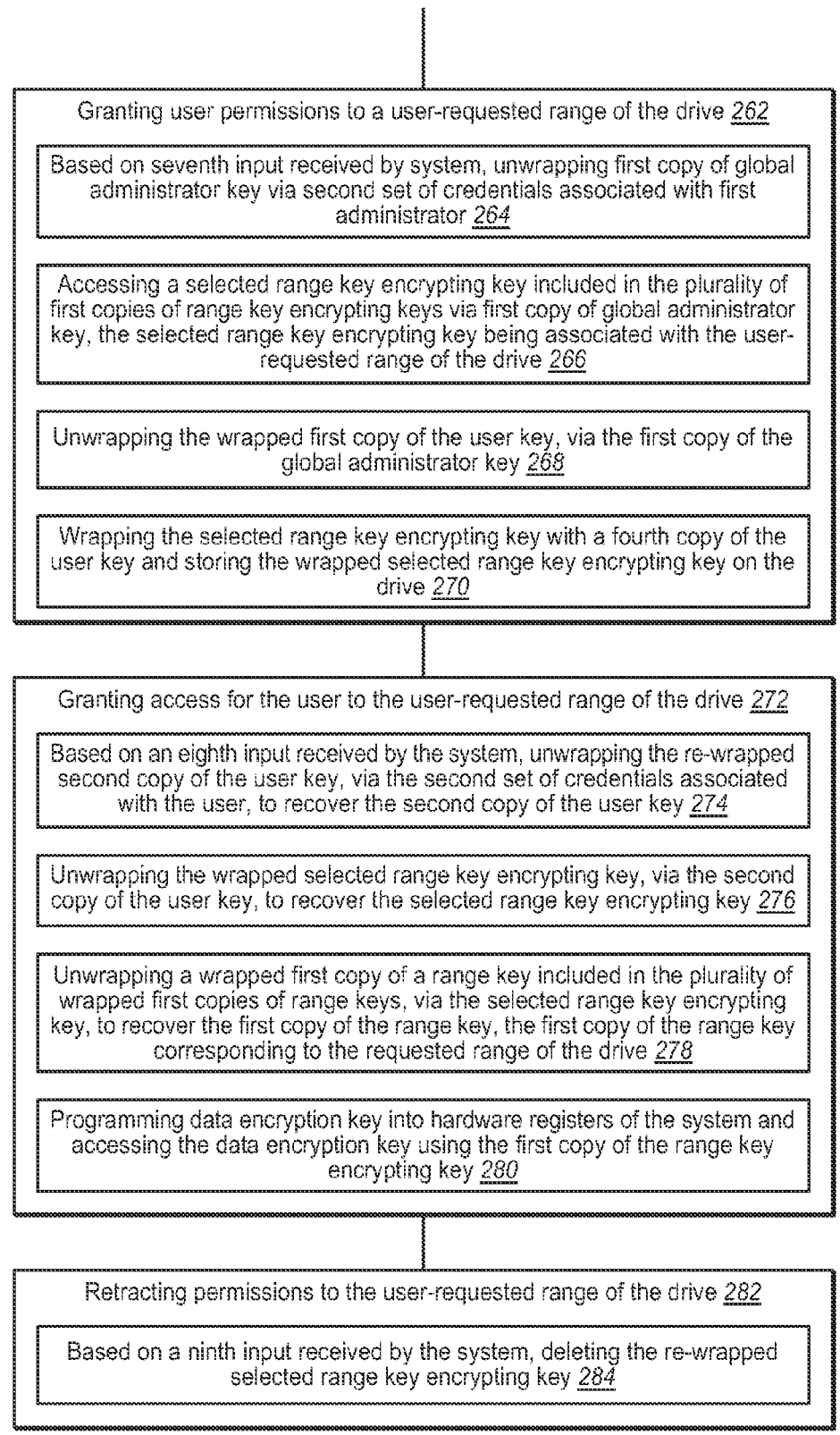

Referring to FIG. 1 (FIG. 1), a system 100 is shown. In embodiments, the system 100 is a storage system (e.g., a storage device). In embodiments, the storage system 100 includes a controller 102. For example, the controller 102 can be a chip, an expansion card, or a stand-alone device that is configured for interfacing with a peripheral device. In embodiments, the controller 102 includes a processor 104. For example, the processor 104 can be hardware which is configured for carrying out instructions of a computer program by performing the basic arithmetical, logical and input/output operations of the system 100.

In embodiments, the controller 102 includes a network interface (e.g., a network interface controller) 106. For example, the network interface 106 can be a computer hardware component configured to connect the system 100 to a computer network 108. In some embodiments, the network interface 106 is used to connect the system 100 to an information handling system device, such as a mobile computing device (e.g., a hand-held portable computer, a personal digital assistant (PDA), a laptop computer, a netbook computer, a tablet computer, and so forth), a mobile telephone device (e.g., a cellular telephone, a smartphone), a portable media player, a multimedia device, an e-book reader device (eReader), a surface computing device (e.g., a table top computer), a Personal Computer (PC) device, and so forth. For instance, the network interface 106 is used to connect a system 100 configured as a portable hard drive to a laptop computer. In other embodiments, the network interface 106 is used to connect the system 100 to a computer network 108 including a collection of computers and other hardware. In embodiments, the computer network 108 is configured for being accessed by one or more administrators 150 and one or more users 152. For example, the administrators 150 may be responsible for: operating the system 100, maintaining the system, the data integrity/security of the system, and/or the performance/efficiency of the system. Further, users 152 (e.g., non-administrator users) may have access to use the system 100, but the system access level of the users 152 is more limited compared to that of the administrators 150. In embodiments, the controller 102 includes a memory 110. For example, the memory 110 can be a physical device configured for storing programs (e.g., sequences of instructions) or data (e.g., program state information) on a temporary or permanent basis for use in a computer or other digital electronic device. In embodiments, the memory 110 of the controller 102 includes a plurality of hardware registers. In embodiments, the memory 110 of the controller 102, the processor 104 and the network interface 106 are communicatively coupled with each other.

In embodiments, the system 100 includes non-volatile memory 112. In embodiments, the non-volatile memory 112 is configured for retaining stored information even when not powered. For example, the non-volatile memory 112 can be read-only memory, flash memory, ferroelectric random access memory (F-RAM), a magnetic storage device (e.g., a hard disk drive), an optical disc, or the like. In embodiments, the non-volatile memory 112 is connected to the controller 102. For example, the non-volatile memory 112 is connected to the processor 104 of the controller 102. In embodiments, the non-volatile memory 112 is configured for storing blocks of data, the blocks being addressed using logical block addresses (LBAs). For example, LBA ranges can be associated with corresponding blocks of data stored in the non-volatile memory 112. In embodiments, reads and writes to/from the non-volatile memory 112 occur at the granularity of the blocks.

FIGS. 2A-2D depict a flowchart illustrating a method for key wrapping via a system to allow secure access to media of the system by multiple authorities with modifiable permissions in accordance with an exemplary embodiment of the present disclosure. In embodiments, the method 200 is implemented on the system 100 described above. In embodiments, the method 200 includes establishing access to the system 100 for a first administrator (e.g., adding a first administrator authority to the system 100) (Step 202). In embodiments, the step of establishing access to the system 100 for the first administrator includes, based on a received input (e.g., first input) to the system 100, generating (e.g., randomly generating) a global administrator key (GAK) (Step 204). In embodiments, the step of establishing access to the system 100 for the first administrator further includes wrapping (e.g., encrypting) a copy (e.g., a first copy) of the global administrator key with credentials (e.g., a first set of credentials, default credentials) associated with the first administrator to provide a wrapped copy (e.g., wrapped first copy) of the global administrator key (Step 206). For example, wrapping (e.g., encrypting) of the data may performed via a cryptographic algorithm (e.g., a key wrap) which uses an encryption standard such as Advanced Encryption Standard (AES) for wrapping the data. AES is a specification for the encryption of electronic data established by the U.S. National Institute of Standards and Technology (NIST) in 2001. Further, administrator (and/or user) credentials may include a password and/or other information associated with the administrator or user. In embodiments, the step of establishing access to the system 100 for the first administrator further includes storing the wrapped copy (e.g., wrapped first copy) of the global administrator key in the non-volatile memory (e.g., on the drive) 112 of the system (Step 208).

In embodiments, the step of establishing access to the system 100 for the first administrator further includes generating (e.g., randomly generating) a plurality of range keys (e.g., data keys) (Step 210). In embodiments, each range key included in the plurality of range keys is associated with a corresponding range of LBAs of the drive 112. The ranges associated with the range keys are non-overlapping ranges. For example, each range key included in the plurality of range keys is configured for providing access to a portion of (e.g., access to data stored on that portion of) the drive 112 associated with the corresponding range of LBAs for that range key. In embodiments, the plurality of range keys collectively provide access to portions of the drive 112 associated with all LBAs of the drive 112.

In embodiments, the step of establishing access to the system 100 for the first administrator further includes generating (e.g., randomly generating) a plurality of range key encrypting keys (e.g., range KEKs) (Step 212). For example, for each range key included in the plurality of range keys, a corresponding range KEK is generated. In embodiments, the step of establishing access to the system 100 for the first administrator further includes wrapping copies (e.g., first copies) of the plurality of range keys with copies (e.g., a first copies) of the plurality of range KEKs and storing the wrapped copies (e.g., wrapped first copies) of the plurality of range keys on the drive 112 (Step 214). For example, a first copy of each range key is wrapped with a first copy of its corresponding range KEK and stored on the drive 112. It is noted that the range keys (e.g., data keys) do not have to be wrapped with the range KEKs, however, if the data keys are wrapped with the range KEKs, then the range is locked at power cycle in order to obtain the credentials to get the user key or administrator key to unwrap the range KEKs (e.g., KEK values to use to unwrap a data encryption key (DEK). In embodiments, the step of establishing access to the system 100 for the first administrator further includes wrapping copies (e.g., second copies) of the plurality of range KEKs with a second copy of the GAK and storing the wrapped copies (e.g., wrapped second copies) of the plurality of range KEKs on the drive 112 (Step 216). In embodiments, the plurality of range keys, the plurality of range KEKs and the global administrator key (e.g., the original range keys, the original range KEKs and the original global administrator key) are not stored on the drive 112 and can only be recovered with the administrator's (e.g., first administrator's) credentials. In embodiments, the first administrator can authenticate using the default credentials and can then change their credentials from the default credentials.

In embodiments, the method 200 includes establishing access to the system 100 for a second administrator (e.g., adding a second/subsequent administrator authority to the system) (Step 218). In embodiments, establishing access to the system 100 for the second administrator requires the first (e.g., current) administrator to be actively authenticated on the system 100. In embodiments, the step of establishing access to the system 100 for the second administrator includes, based on a received input (e.g., second input) to the system 100, unwrapping (e.g., decrypting) the wrapped first copy of the global administrator key and the wrapped first copies of the plurality of range keys, via the first set of credentials associated with the first administrator, to recover the first copy of the global administrator key and the first copies of the plurality of range KEKs (e.g., the first copies of all of the range KEKs) (Step 220). In embodiments, the step of establishing access to the system 100 for the second administrator includes wrapping a third copy of the global administrator key with a first set of credentials (e.g., default credentials) associated with the second/subsequent administrator and storing the wrapped third copy of the global administrator key on the drive 112 (Step 222). An exemplary (e.g., alternative) implementation could attempt to save space by only saving a wrapped GAK per administrator and then having one saved copy of each range KEK wrapped with the GAK. In embodiments, the step of establishing access to the system 100 for the second administrator includes wrapping third copies of the plurality of range KEKs with a fourth copy of the GAK and storing the wrapped third copies of the plurality of range KEKs on the drive 112 (Step 224). In embodiments, the first copy of the global administrator key and the wrapped second copies of the plurality of range KEKs stored on the drive 112 for the first administrator (e.g., acting administrator) are unmodified. In embodiments, the second administrator (e.g., newly created administrator) authenticates using their default credentials and then changes their credentials from the defaults.

In embodiments, the method 200 includes updating credentials of the first administrator (e.g., acting administrator, current administrator authority) (Step 226). In embodiments, updating credentials of the first administrator includes, based on a received input (e.g., third input) to the system 100, unwrapping the wrapped first copy of the global administrator key and the wrapped first copies of the plurality of range keys, via the first set of credentials associated with the first administrator, to recover the first copy of the global administrator key and the first copies of the plurality of range KEKs (e.g., the first copies of all of the range KEKs) (Step 228). In embodiments, updating the credentials of the first administrator includes re-wrapping the first copy of the global administrator key with a second set (e.g., an updated set, a new set) of credentials associated with the first administrator and storing the re-wrapped first copy of the global administrator key on the drive 112 (Step 230).

In embodiments, the method 200 includes allowing the first administrator to access a range (e.g., any range) of the drive 112 (Step 232). In embodiments, allowing the first administrator (e.g., acting administrator) to access a range of the drive 112 includes, based on a received input (e.g., fourth input) to the system 100, unwrapping the first copy of the GAK via utilization of the second set of credentials associated with the first administrator, to recover the first copy of the range KEK, the range KEK being associated with the range of the drive 112 the first administrator is trying to access (Step 234). For a user, the KEK would be accessed (e.g., unwrapped) with a user key that was wrapped with user credentials. It should be noted that it is not required that the first administrator update their credentials prior to this step. In embodiments, allowing the first administrator to access a range of the drive 112 includes unwrapping a wrapped first copy of a range key included in the plurality of wrapped first copies of range keys, via the first copy of the range KEK (Step 236). For example, the unwrapped first copy of the range key corresponds to the first copy of the range KEK used to unwrap it and further corresponds to the range of the drive 112 the first administrator is trying to access. In embodiments, allowing the first administrator to access a range of the drive 112 includes programming a data encryption key (DEK) into hardware registers and accessing (e.g., unwrapping) the DEK using the first copy of the range KEK. (Step 238). The above steps (Steps 232-238) may be implemented for allowing the administrator to access any range of the drive 112.

In embodiments, the method 200 includes establishing access to the system 100 for a user (e.g., adding a new user to the system 100) (Step 240). In embodiments, adding a new user (e.g., non-administrator) to the system 100 requires authorization by an active administrator and may be performed via the steps discussed below. In embodiments, establishing access to the system 100 for a user includes, based on a received input (e.g., fifth input) to the system 100, unwrapping the re-wrapped first copy of the global administrator key via the current (e.g., second) set of credentials of the active (e.g., first) administrator (Step 242). In embodiments, establishing access to the system 100 for a user includes accessing a subset of the first copies of the plurality of range KEKs via the current (e.g., second) set of credentials of the active (e.g., first) administrator, the subset including only range KEKs associated with ranges of the drive 112 the user is authorized to access (Step 244). In embodiments, establishing access to the system 100 for a user includes generating (e.g., randomly generating) a user key (Step 246). In embodiments, establishing access to the system 100 for a user includes wrapping a first copy of the user key with the first copy of the global administrator key and storing the wrapped first copy of the user key on the drive 112 (Step 248). In embodiments, establishing access to the system 100 for a user includes wrapping a second copy of the user key with a first set of credentials (e.g., default credentials) associated with the user and storing the wrapped second copy of the user key on the drive 112 (Step 250). In embodiments, establishing access to the system 100 for a user includes wrapping the subset of the first copies of the range KEKs with a third copy of the user key (Step 252). In embodiments, the user (e.g., newly created user) authenticates using the first set of credentials (e.g., default credentials) associated with the user and then changes the credentials from the default credentials.

In embodiments, the method 200 includes updating credentials of the user (Step 254). In embodiments, updating credentials of the user includes, based on a received input (e.g., sixth input) to the system 100, unwrapping the second copy of the user key via the first set of credentials associated with the user (Step 256). In embodiments, updating credentials of the user includes re-wrapping the second copy of the user key with a second set of credentials (e.g., new credentials) associated with the user (Step 258) and storing the re-wrapped second copy of the user key on the drive 112 (Step 260). In embodiments, the re-wrapped second copy of the user key overwrites the previously stored wrapped second copy (e.g., the copy created and stored at Step 250).

In embodiments, the method 200 includes granting user permissions to a user-requested range of the drive 112 (Step 262). In embodiments, an administrator authorizes granting of the permissions to the user. In embodiments, granting user permissions to a user-requested range of the drive 112 includes, based on a received input (e.g., seventh input) to the system 100, unwrapping the first copy of the global administrator key via the second set of credentials associated with the first administrator (Step 264). In embodiments, granting user permissions to a user-requested range of the drive 112 includes accessing a selected range KEK included in the plurality of range KEKs via the first copy of the GAK, the selected range KEK being associated with the user-requested range of the drive 112 (Step 266). In embodiments, granting user permissions to a user-requested range of the drive 112 includes unwrapping the wrapped first copy of the user key, via the first copy of the GAK (Step 268). In embodiments, granting user permissions to a user-requested range of the drive 112 includes wrapping the selected range KEK with a fourth copy of the user key and storing the wrapped selected range KEK on the drive 112 (Step 270).

In embodiments, the method 200 includes granting access for the user to the user-requested range of the drive 112 (Step 272). In embodiments, granting access for the user to the user-requested range of the drive 112 includes, based on a received input (e.g., eighth input) to the system 100, unwrapping the re-wrapped second copy of the user key, via the second set of credentials associated with the user, to recover the second copy of the user key (Step 274). In embodiments, granting access for the user to the user-requested range of the drive 112 includes unwrapping the wrapped selected range KEK, via the second copy of the user key, to recover the selected range KEK (Step 276). This step will fail if the user does not have permission to access this range. In embodiments, granting access for the user to the user-requested range of the drive 112 includes unwrapping a wrapped first copy of a range key included in the plurality of wrapped first copies of range keys, via the selected range KEK, to recover the first copy of the range key, the first copy of the range key corresponding to the requested range of the drive 112 (Step 278). In embodiments, granting access for the user to the user-requested range of the drive 112 includes programming a data encryption key (DEK) into hardware registers and accessing the DEK using the first copy of the range KEK (Step 280).

In embodiments, the method 200 includes retracting permissions to the user-requested range of the drive 112 (Step 282). In embodiments, retracting permissions to the user-requested range of the drive 112 includes, based on a received input (e.g., ninth input) to the system 100, deleting the re-wrapped selected range KEK (Step 284).

In embodiments, the steps of the method 200 are performed by one or more software programs executing on the processor 104 of the system 100. In embodiments the inputs received by the system 100 for triggering performance of the steps of the method 200 described above are received via the network interface 108.

The system and method embodiments described herein allow for data on the drive 112 to be recovered only by those with proper credentials. The keys used to encrypt ranges of the drive are not stored in plaintext and are recoverable using the credentials of an administrator or user with access to that particular range. An outside attacker cannot recover these keys and a malicious user can only recover the keys to the ranges that user is allowed to access. This is maintained while allowing administrators to modify permissions at any time and, while allowing both administrators and users to change their credentials at any time.

The method disclosed herein provides a method for implementation in a self-encrypting drive by which multiple authorities are allowed secure access to the media based on configurable permissions. The multiple authorities are divided into two categories: administrators (e.g., the administrators have complete access to the drive); and users (e.g., the users have access permissions that can be modified by an administrator at any time). The method disclosed herein provides assurance that an outside attacker would be unable to retrieve data from the drive and that a malicious user would only be able to retrieve the data that an administrator had already given them permission to access.

The system(s) and method(s) described herein provide a level of indirection between a particular administrator's credentials and credentials that can be used by any administrator by introducing a single global administrator key. The global administrator key is randomly generated when the first administrator is added to the system, the global administrator key is never stored directly on the system. Each administrator keeps a copy of the global administrator key wrapped with that administrator's credentials. The system(s) and method(s) disclosed herein provide a level of indirection between a user's current credentials and a set of permanent credentials for that user by introducing a generated user key for each user. The user key is randomly generated when a user is created and is never stored directly on the system. One copy of the user key is wrapped with the user's current credentials and stored for user access. A second copy of the user key is wrapped with the global administrator key and stored for administrator access when updating permissions. For each range of the drive 112 that a particular user is allowed to access, a copy of a key allowing access to that range of the drive is stored wrapped with the user key. As permissions are modified by administrators, the modifying administrator can either remove wrapped KEKs (e.g., wrapped KEK values) to prevent user access to a range or recover the user key to wrap a copy of the range key to allow a user access to that range. A malicious user is unable to recover the keys to ranges they are not authorized to access. It is contemplated that one or more of the steps described herein can be executed (e.g., performed) as many times as the administrator or user desires and at any time, so long as the administrator or user is currently active on the system 100.

It is to be noted that the foregoing described embodiments may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the embodiments described herein may be conveniently implemented in forms of a software package. Such a software package may be a computer program product which employs a non-transitory computer-readable storage medium including stored computer code which is used to program a computer to perform the disclosed functions and processes disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for key wrapping via a storage system to allow secure access to media of the system by multiple authorities with modifiable permissions, the method comprising:

establishing access to the system for a first administrator, wherein establishing access to the system for the first administrator includes: based on a first input received by the system, randomly generating a global administrator key; wrapping a first copy of the global administrator key with a first set of credentials associated with the first administrator to provide a wrapped first copy of the global administrator key; storing the wrapped first copy of the global administrator key in a drive of the system; randomly generating a plurality of range keys, the plurality of range keys being associated with ranges of logical block addresses of the drive; randomly generating a plurality of range key encrypting keys, the plurality of range encrypting keys corresponding to the plurality of range keys; wrapping first copies of the plurality of range keys with first copies of the plurality of range key encrypting keys and storing the wrapped first copies of the plurality of range keys on the drive; and wrapping second copies of the plurality of range key encrypting keys with a second copy of the global administrator key and storing the wrapped second copies of the plurality of range key encrypting keys on the drive;

establishing access to the system for a non-administrator user, including: randomly generating a user key, wrapping a first copy of the user key with the first copy of the global administrator key and storing the wrapped first copy of the user key on the drive; wrapping a second copy of the user key with a first set of credentials associated with the user and storing the wrapped second copy of the user key on the drive; and wrapping a third copy of the user key with a subset of the first copies of the range key encrypting keys; and granting user permissions by the first administrator to the user for a user-requested range of the drive, including: unwrapping the first copy of the global administrator key via the first set of credentials associated with the first administrator; accessing a selected range key encrypting key included in the plurality of first copies of range key encrypting keys via the first copy of the global administrator key, the selected range key encrypting key being associated with the user-requested range of the drive; unwrapping the wrapped first copy of the user key, via the first copy of the global administrator key; wrapping the selected range key encrypting key with a fourth copy of the user key and storing the wrapped selected range key encrypting key on the drive.

2. The method as claimed in claim 1, further comprising:

establishing access to the system for a second administrator, wherein establishing access to the system for the second administrator includes: based on a second input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys; wrapping a third copy of the global administrator key with a first set of credentials associated with the second administrator and storing the wrapped third copy of the global administrator key on the drive; wrapping third copies of the plurality of range key encrypting keys with a fourth copy of the global administrator key and storing the wrapped third copies of the plurality of range key encrypting keys on the drive, wherein the first administrator is actively authenticated on the system during the step of establishing access to the system for the second administrator.

3. The method as claimed in claim 2, further comprising: updating credentials of the first administrator, including: based on a third input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys; and re-wrapping the first copy of the global administrator key with a second set of credentials associated with the first administrator and storing the re-wrapped first copy of the global administrator key on the drive.

4. The method as claimed in claim 3, further comprising: allowing the first administrator to access a range of the drive, including: based on a fourth input received by the system, unwrapping the first copy of the global administrator key, via utilization of the second set of credentials associated with the first administrator, to recover the first copy of the range key encrypting key, the range key encrypting key being associated with the range of the drive; unwrapping a wrapped first copy of a range key included in the plurality of wrapped first copies of range keys, via the first copy of the range key encrypting key, the unwrapped first copy of the range key corresponding to the first copy of the range key encrypting key; and programming data encryption key into hardware registers of the system and accessing the data encryption key using the first copy of the range key encrypting key.

5. The method as claimed in claim 4, further comprising: establishing access to the system for a second non-administrator user, including: based on a fifth input received by the system, unwrapping the re-wrapped first copy of the global administrator key via the second set of credentials of the first administrator; accessing a subset of the first copies of the plurality of range key encrypting keys via the second set of credentials of the first administrator, the subset including only range key encrypting keys associated with ranges of the drive the second user is authorized to access; randomly generating a second user key; wrapping a first copy of the second user key with the first copy of the global administrator key and storing the wrapped first copy of the second user key on the drive; wrapping a second copy of the second user key with a first set of credentials associated with the second user and storing the wrapped second copy of the second user key on the drive; and wrapping a third copy of the second user key with the subset of first copies of the range key encrypting keys.

6. The method as claimed in claim 5, further comprising: updating credentials of the second user, including: based on a sixth input received by the system, unwrapping the second copy of the second user key via the first set of credentials associated with the second user; re-wrapping the second copy of the second user key with a second set of credentials associated with the second user; and storing the re-wrapped second copy of the second user key on the drive.

7. The method as claimed in claim 6, further comprising: granting user permissions by the first administrator or the second administrator to the second user for a second user-requested range of the drive, including: based on a seventh input received by the system, unwrapping the first copy of the global administrator key via the second set of credentials associated with the first administrator; accessing a selected range key encrypting key included in the plurality of first copies of range key encrypting keys via the first copy of the global administrator key, the selected range key encrypting key being associated with the second user-requested range of the drive; unwrapping the wrapped first copy of the second user key, via the first copy of the global administrator key; wrapping the selected range key encrypting key with a fourth copy of the second user key and storing the wrapped selected range key encrypting key on the drive.

8. The method as claimed in claim 7, further comprising: granting access for the second user to the second user-requested range of the drive, including: based on an eighth input received by the system, unwrapping the re-wrapped second copy of the second user key, via the second set of credentials associated with the second user, to recover the second copy of the second user key; unwrapping the wrapped selected range key encrypting key, via the second copy of the second user key, to recover the selected range key encrypting key; unwrapping a wrapped first copy of a range key included in the plurality of wrapped first copies of range keys, via the selected range key encrypting key, to recover the first copy of the range key, the first copy of the range key corresponding to the requested range of the drive; and programming a data encryption key into hardware registers of the system and accessing the data encryption key using the first copy of the range key encrypting key.

9. The method as claimed in claim 8, further comprising: retracting permissions to the second user-requested range of the drive, including: based on a ninth input received by the system, deleting the re-wrapped selected range key encrypting key.

10. A non-transitory computer-readable medium having computer-executable instructions for performing a method for key wrapping via a storage system to allow secure access to media of the system by multiple authorities with modifiable permissions, the method comprising:
establishing access to the system for a first administrator, wherein establishing access to the system for the first administrator includes: based on a first input received by the system, randomly generating a global administrator key; wrapping a first copy of the global administrator key with a first set of credentials associated with the first administrator to provide a wrapped first copy of the global administrator key; storing the wrapped first copy of the global administrator key in a drive of the system; randomly generating a plurality of range keys, the plurality of range keys being associated with ranges of logical block addresses of the drive; randomly generating a plurality of range key encrypting keys, the plurality of range encrypting keys corresponding to the plurality of range keys; wrapping first copies of the plurality of range keys with first copies of the plurality of range key encrypting keys and storing the wrapped first copies of the plurality of range keys on the drive; and wrapping second copies of the plurality of range key encrypting keys with a second copy of the global administrator key and storing the wrapped second copies of the plurality of range key encrypting keys on the drive;

establishing access to the system for a non-administrator user, including: randomly generating a user key, wrapping a first copy of the user key with the first copy of the global administrator key and storing the wrapped first copy of the user key on the drive; wrapping a second copy of the user key with a first set of credentials associated with the user and storing the wrapped second copy of the user key on the drive; and wrapping a third copy of the user key with a subset of the first copies of the range key encrypting keys; and granting user permissions by the first administrator to the user for a user-requested range of the drive, including: unwrapping the first copy of the global administrator key via the first set of credentials associated with the first administrator; accessing a selected range key encrypting key included in the plurality of first copies of range key encrypting keys via the first copy of the global administrator key, the selected range key encrypting key being associated with the user-requested range of the drive; unwrapping the wrapped first copy of the user key, via the first copy of the global administrator key; wrapping the selected range key encrypting key with a fourth copy of the user key and storing the wrapped selected range key encrypting key on the drive.

11. The non-transitory computer-readable medium as claimed in claim 10, the method further comprising:

establishing access to the system for a second administrator, wherein establishing access to the system for the second administrator includes: based on a second input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys; wrapping a third copy of the global administrator key with a first set of credentials associated with the second administrator and storing the wrapped third copy of the global administrator key on the drive; wrapping third copies of the plurality of range key encrypting keys with a fourth copy of the global administrator key and storing the wrapped third copies of the plurality of range key encrypting keys on the drive, wherein the first administrator is actively authenticated on the system during the step of establishing access to the system for the second administrator.

12. The non-transitory computer-readable medium as claimed in claim 11, the method further comprising:

updating credentials of the first administrator, including: based on a third input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys; and re-wrapping the first copy of the global administrator key with a second set of credentials associated with the first administrator and storing the re-wrapped first copy of the global administrator key on the drive.

13. The non-transitory computer-readable medium as claimed in claim 12, the method further comprising:

allowing the first administrator to access a range of the drive, including: based on a fourth input received by the system, unwrapping the first copy of the global administrator key, via utilization of the second set of credentials associated with the first administrator, to recover the first copy of the range key encrypting key, the range key encrypting key being associated with the range of the drive; unwrapping a wrapped first copy of a range key included in the plurality of wrapped first copies of range keys, via the first copy of the range key encrypting key, the unwrapped first copy of the range key corresponding to the first copy of the range key encrypting key; and programming a data encryption key into hardware registers of the system and accessing the data encryption key using the first copy of the range key encrypting key.

14. The non-transitory computer-readable medium as claimed in claim 13, the method further comprising:

establishing access to the system for a second non-administrator user, including: based on a fifth input received by the system, unwrapping the re-wrapped first copy of the global administrator key via the second set of credentials of the first administrator; accessing a subset of the first copies of the plurality of range key encrypting keys via the second set of credentials of the first administrator, the subset including only range key encrypting keys associated with ranges of the drive the second user is authorized to access; randomly generating a second user key; wrapping a first copy of the second user key with the first copy of the global administrator key and storing the wrapped first copy of the second user key on the drive; wrapping a second copy of the second user key with a first set of credentials associated with the second user and storing the wrapped second copy of the second user key on the drive; and wrapping a third copy of the second user key with the subset of first copies of the range key encrypting keys.

15. The non-transitory computer-readable medium as claimed in claim 14, the method further comprising:

updating credentials of the second user, including: based on a sixth input received by the system, unwrapping the second copy of the second user key via the first set of credentials associated with the second user; re-wrapping the second copy of the second user key with a second set of credentials associated with the second user; and storing the re-wrapped second copy of the second user key on the drive.

16. The non-transitory computer-readable medium as claimed in claim 15, the method further comprising:

granting user permissions by the first administrator or the second administrator to the second user for a second user-requested range of the drive, including: based on a seventh input received by the system, unwrapping the first copy of the global administrator key via the second set of credentials associated with the first administrator; accessing a selected range key encrypting key included in the plurality of first copies of range key encrypting keys via the first copy of the global administrator key, the selected range key encrypting key being associated with the second user-requested range of the drive; unwrapping the wrapped first copy of the second user key, via the first copy of the global administrator key; wrapping the selected range key encrypting key with a fourth copy of the second user key and storing the wrapped selected range key encrypting key on the drive.

17. The non-transitory computer-readable medium as claimed in claim 16, the method further comprising:

granting access for the second user to the second user-requested range of the drive, including: based on an eighth input received by the system, unwrapping the re-wrapped second copy of the second user key, via the second set of credentials associated with the second user, to recover the second copy of the second user key; unwrapping the wrapped selected range key encrypting key, via the second copy of the second user key, to recover the selected range key encrypting key; unwrapping a wrapped first copy of a range key included in the plurality of wrapped first copies of range keys, via the selected range key encrypting key, to recover the first copy of the range key, the first copy of the range key corresponding to the requested range of the drive; and programming a data encryption key into hardware registers of the system and accessing the data encryption key using the first copy of the range key encrypting key.

18. The non-transitory computer-readable medium as claimed in claim 16, the method further comprising:
retracting permissions to the second user-requested range of the drive, including: based on a ninth input received by the system, deleting the re-wrapped selected range key encrypting key.

19. A storage system, comprising:
a controller, the controller including a processor, a network interface and a memory;
a non-volatile memory, the non-volatile memory being connected to the controller; and
control programming for performing a method for key wrapping for promoting secure access to media of the storage system by multiple authorities with modifiable permissions, the method including: establishing access to the system for a first administrator, wherein establishing access to the system for the first administrator includes: based on a first input received by the system, randomly generating a global administrator key; wrapping a first copy of the global administrator key with a first set of credentials associated with the first administrator to provide a wrapped first copy of the global administrator key; storing the wrapped first copy of the global administrator key in the non-volatile memory of the system; randomly generating a plurality of range keys, the plurality of range keys being associated with ranges of logical block addresses of the non-volatile memory; randomly generating a plurality of range key encrypting keys, the plurality of range encrypting keys corresponding to the plurality of range keys; wrapping first copies of the plurality of range keys with first copies of the plurality of range key encrypting keys and storing the wrapped first copies of the plurality of range keys in the non-volatile memory; and wrapping second copies of the plurality of range key encrypting keys with a second copy of the global administrator key and storing the wrapped second copies of the plurality of range key encrypting keys in the non-volatile memory;
establishing access to the system for a non-administrator user, including: randomly generating a user key, wrapping a first copy of the user key with the first copy of the global administrator key and storing the wrapped first copy of the user key in the non-volatile memory; wrapping a second copy of the user key with a first set of credentials associated with the user and storing the wrapped second copy of the user key in the non-volatile memory; and wrapping a third copy of the user key with a subset of the first copies of the range key encrypting keys; and
granting user permissions by the first administrator to the user for a user-requested range of the non-volatile memory, including: unwrapping the first copy of the global administrator key via the first set of credentials associated with the first administrator; accessing a selected range key encrypting key included in the plurality of first copies of range key encrypting keys via the first copy of the global administrator key, the selected range key encrypting key being associated with the user-requested range of the non-volatile memory; unwrapping the wrapped first copy of the user key, via the first copy of the global administrator key; wrapping the selected range key encrypting key with a fourth copy of the user key and storing the wrapped selected range key encrypting key in the non-volatile memory.

20. The storage system as claimed in claim 19, wherein the method further includes:
establishing access to the system for a second administrator, wherein establishing access to the system for the second administrator includes: based on a second input received by the system, unwrapping the wrapped first copy of the global administrator key and the wrapped first copies of the plurality of range keys, via the first set of credentials associated with the first administrator, to recover the first copy of the global administrator key and the first copies of the plurality of range key encrypting keys; wrapping a third copy of the global administrator key with a first set of credentials associated with the second administrator and storing the wrapped third copy of the global administrator key in the non-volatile memory; wrapping third copies of the plurality of range key encrypting keys with a fourth copy of the global administrator key and storing the wrapped third copies of the plurality of range key encrypting keys in the non-volatile memory, wherein the first administrator is actively authenticated on the system during the step of establishing access to the system for the second administrator.

* * * * *